United States Patent
Miyajima

(10) Patent No.: US 10,197,463 B2
(45) Date of Patent: Feb. 5, 2019

(54) DYNAMIC QUANTITY MEASURING DEVICE AND PRESSURE SENSOR USING SAME

(71) Applicant: Hitachi Automotive Systems, Ltd., Hitachinaka-shi, Ibaraki (JP)

(72) Inventor: Kentarou Miyajima, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 218 days.

(21) Appl. No.: 15/314,768

(22) PCT Filed: Jun. 1, 2015

(86) PCT No.: PCT/JP2015/065717
§ 371 (c)(1),
(2) Date: Nov. 29, 2016

(87) PCT Pub. No.: WO2015/190331
PCT Pub. Date: Dec. 17, 2015

(65) Prior Publication Data
US 2017/0199096 A1 Jul. 13, 2017

(30) Foreign Application Priority Data
Jun. 9, 2014 (JP) .................................. 2014-118286

(51) Int. Cl.
*G01L 9/00* (2006.01)
*G01L 27/00* (2006.01)
*G01M 15/08* (2006.01)

(52) U.S. Cl.
CPC .............. *G01L 9/0051* (2013.01); *G01L 9/00* (2013.01); *G01L 27/00* (2013.01); *G01M 15/08* (2013.01)

(58) Field of Classification Search
CPC .................................................... G01L 9/0051
(Continued)

(56) References Cited

U.S. PATENT DOCUMENTS

| 5,035,148 A | 7/1991 | Okada |
| 6,169,965 B1 | 1/2001 | Kubisiak et al. |

(Continued)

FOREIGN PATENT DOCUMENTS

| CN | 10860355 A | 11/2006 |
| CN | 101046368 A | 10/2007 |

(Continued)

OTHER PUBLICATIONS

International Search Report (PCT/ISA/210) issued in PCT Application No. PCT/JP2015/065717 dated Jul. 7, 2015 with English translation (Two (2) pages).

(Continued)

*Primary Examiner* — Manish S Shah
*Assistant Examiner* — Jean Morello
(74) *Attorney, Agent, or Firm* — Crowell & Moring LLP

(57) ABSTRACT

Provided are a dynamic quantity measuring device having higher accuracy and longer-term reliability than in the prior art, and a pressure sensor using the same. A dynamic quantity measuring device is provided with a first Wheatstone bridge configured by an impurity diffused resistor on a principal surface of one semiconductor substrate, and detects a difference between strain quantities respectively generated in an x-axis direction and a y-axis direction that are orthogonal to each other on the principal surface of the semiconductor substrate by the first Wheatstone bridge, the dynamic quantity measuring device being provided with, on the principal surface of the semiconductor substrate, a second Wheatstone bridge for detecting the strain quantity in the x-axis direction, and a third Wheatstone bridge for detecting the strain quantity in the y-axis direction.

13 Claims, 13 Drawing Sheets

(58) Field of Classification Search
USPC ......................................................... 73/114.18
See application file for complete search history.

(56) References Cited

U.S. PATENT DOCUMENTS

| | | | |
|---|---|---|---|
| 6,422,088 B1 | 7/2002 | Oba et al. | |
| 7,707,894 B2* | 5/2010 | Sumigawa ............... | G01B 7/16 73/727 |
| 2006/0185428 A1* | 8/2006 | Combi ................ | G01P 15/0802 73/146.4 |
| 2007/0000335 A1 | 1/2007 | Morimoto | |
| 2007/0228500 A1 | 10/2007 | Shimazu et al. | |
| 2011/0259112 A1 | 10/2011 | Shimazu et al. | |
| 2011/0283804 A1 | 11/2011 | Jost et al. | |
| 2012/0118068 A1 | 5/2012 | Yamada et al. | |
| 2013/0118268 A1 | 5/2013 | Shimazu et al. | |
| 2014/0042566 A1* | 2/2014 | Ota ........................ | H01L 41/04 257/417 |

FOREIGN PATENT DOCUMENTS

| | | | | |
|---|---|---|---|---|
| CN | 201464117 U | | 5/2010 | |
| CN | 202158916 U | | 3/2012 | |
| CN | 103477182 A | | 12/2013 | |
| CN | 103822749 A | | 5/2014 | |
| EP | 0 381 187 A2 | | 8/1990 | |
| JP | 2001272293 A | * | 10/2001 | ............... G01L 9/04 |
| JP | 2002-39891 A | | 2/2002 | |
| JP | 2007-263781 A | | 10/2007 | |
| JP | 2012197938 A | * | 10/2012 | ............... G01L 9/00 |
| JP | 2013195097 A | * | 9/2013 | ............... G01L 9/00 |
| WO | WO201503369 A | * | 3/2015 | ............... G01B 7/16 |

OTHER PUBLICATIONS

Japanese-language Written Opinion (PCT/ISA/237) issued in PCT Application No. PCT/JP2015/065717 dated Jul. 7, 2015 (Three (3) pages).
Extended European Search Report issued in counterpart European Patent Application No. 15807480.7 dated Feb. 2, 2018 (Six (6) pages).
Chinese-language Office Action issued in counterpart Chinese Application No. 201580030863.6 dated Jul. 11, 2018 with English translation (thirteen (13) pages).

* cited by examiner

DYNAMIC QUANTITY MEASURING DEVICE AND PRESSURE SENSOR USING SAME

TECHNICAL FIELD

The present invention relates to a technique to measure a mechanical quantity of stress or strain applied to a measurement target object, and particularly to a mechanical quantity measurement device, which is provided with a strain detection region configured using an impurity diffusion resistor formed on a surface of a semiconductor substrate, and a pressure sensor using the same.

BACKGROUND ART

A metal foil strain gauge, which is provided with a metal resistor (metal foil) on a thin insulator, has been well known from a long time ago as a device to measure deformation (strain) of a measurement target object. The metal foil strain gauge is configured to measure a change of an electrical resistance value according to deformation of the metal foil, which depends on deformation of the measurement target object, and to convert the measured value into the amount of strain and is highly accurate despite its simple structure and low price, and thus, has been widely used. Meanwhile, the metal foil strain gauge has weak points in terms of its configuration such as a point that a measurement error is likely to occur if temperature of an object to be measured is changed, a point that power consumption is too great to constantly drive the gauge, and a point that a certain extent of installation area is required.

A semiconductor strain sensor, which is provided with a strain detection region (bridge circuit) configured using an impurity diffusion resistor formed on a surface of a semiconductor substrate, has been developed as a device to overcome those weak points of the metal foil strain gauge. In the semiconductor strain sensor, a resistance change rate of the impurity diffusion resistor in relation to strain is as large as several tens of times that of the metal resistor of the conventional metal foil strain gauge, and thus, can detect even minute strain (that is, there is an advantage that the sensitivity with respect to strain is high). In addition, the impurity diffusion resistor can have finer pattern by employing a so-called semiconductor process such as photolithography for formation of the impurity diffusion resistor, and it is possible to miniaturize (reduce the area of) the entire semiconductor strain sensor and to obtain power saving. Further, it is possible to form all resistors, which form Wheatstone bridge circuit, on the same substrate through the finer pattern of the impurity diffusion resistor, and thus, there is also an advantage that a variation of electrical resistance in relation to the change in temperature of the object to be measured is offset, and the measurement error decreases (the measurement accuracy is improved).

For example, Japanese Patent Application Laid-open No. 2007-263781 (PTL 1) describes a mechanical quantity measuring device that is provided with a strain detection unit on a surface of a semiconductor substrate and is adhered to a measuring object to measure strain. In this mechanical quantity measuring device, at least two or more sets of bridge circuits are formed on a semiconductor monocrystalline substrate. One bridge circuit among the two sets of bridge circuits is configured using an n-type diffusion resistor in which a direction of causing electric current to flow and measuring a variation of a resistance value (longitudinal direction) is parallel with a direction <100> of the semiconductor monocrystalline substrate. Another bridge circuit is configured in combination with a p-type diffusion resistor in which a longitudinal direction is parallel with a direction <110>. According to PTL 1, it is possible to measure a strain component generated in the measuring object in a specific direction with high precision (see Abstract).

CITATION LIST

Patent Literature

PTL 1: Japanese Patent. Application Laid-Open No. 2007-263781

SUMMARY OF INVENTION

Technical Problem

Various techniques, configured for more effective fuel combustion, have been studied and adopted in order for saving of energy and cleaning of an exhaust gas in an automobile engine. Recently, however, the request for saving of energy and cleaning of the exhaust gas has increased more and more. A representative of the combustion techniques aiming at the saving of energy is a technique that realizes combustion under a condition with thinner air than a stoichiometric air fuel ratio. In addition, a representative of the combustion techniques aiming at the cleaning of the exhaust gas is a technique that realizes stable and reliable combustion inside a cylinder.

It is essential to precisely control injection of fuel in order to effectively realize those combustion techniques. Further, a pressure sensor relating to injection pressure control is one of key parts for realization of the precise control of fuel injection.

For example, an attempt for further increasing fuel pressure (for example, atmospheric pressure of 2500 to 3000) has been conducted in a common rail system for a diesel engine in order to promote the saving of energy and the cleaning of the exhaust gas. Further, there has been a strong demand for higher pressure resistance and durability (long-term reliability) of component parts. In addition, the pressure sensor is a part serving as the basis of the precise control among the component parts, and there has been a strong demand for higher accuracy as well as the pressure resistance and durability regarding the pressure sensor.

The semiconductor strain sensor described in PTL 1 has the above-described excellent operational effects. However, it has been found out that an additional improvement is also required for the semiconductor strain sensor (mechanical quantity measuring device) in order to achieve the latest request level (particularly, the high accuracy and the long-term reliability) in relation to the pressure sensor (details will be described later).

An object of the present invention is to provide a semiconductor strain sensor (mechanical quantity measurement device) that has higher accuracy and long-term reliability than those of the related art. In addition, another object is to provide a pressure sensor using the mechanical quantity measurement device that has higher accuracy and long-term reliability than those of the related art.

Solution to Problem

In order to achieve the above-described object, a mechanical quantity measurement, device according to the present invention is a mechanical quantity measurement device including a strain detection region which is configured using an impurity diffusion resistor formed on a main surface of a semiconductor substrate. The strain detection region includes a plurality of Wheatstone bridges. A difference between a strain amount in an x-axis direction and a strain amount in a y-axis direction, which are orthogonal to each other on the semiconductor substrate, is detected by one Wheatstone bridge among the plurality of Wheatstone bridges. The strain amount in the x-axis direction and the strain amount in the y-axis direction are independently detected, and the difference between the strain amount generated in the x-axis direction and the y-axis direction, an absolute value of the strain amount in the x-axis direction, an absolute value of the strain amount in the y-axis direction are measured by other Wheatstone bridges among the plurality of Wheatstone bridges.

In addition, a pressure sensor according to the present invention is a pressure sensor in which a semiconductor strain sensor is bonded onto a metallic diaphragm and the semiconductor strain sensor is configured using the mechanical quantity measurement device.

Advantageous Effects of Invention

According to the present invention, it is possible to provide the mechanical quantity measurement device that has higher accuracy and long-term reliability than those of the related art. In addition, it is possible to provide the pressure sensor using the mechanical quantity measurement device that has higher accuracy and long-term reliability than those of the related art.

DESCRIPTION OF EMBODIMENTS

In the following Examples according to the present invention, a description will be given by exemplifying embodiments that enhance reliability at a mounting interface between a diaphragm and a silicon chip in a pressure sensor.

A request relating to application temperature range, weather resistance, accuracy, long-term reliability, or the like is particularly severe in a field of automobile parts among other fields of various industrial parts. The present inventor and the like have conducted studies in order to satisfy various latest requests in the pressure sensor using a semiconductor strain sensor, and have found out that there is a phenomenon where damage occurs at a bonding interface between the silicon chip and the diaphragm even if a value of a Wheatstone bridge including four P-type diffusion resistors, arranged inside the semiconductor strain sensor, is within a normal range, and this phenomenon is a problem that relates to the accuracy and the long-term reliability and needs to be solved. Thus, the present inventor and the like have attempted detection of the amount of strain that causes the damage at the bonding surface or the silicon chip using another means that is different from the Wheatstone bridge using the four P-type diffusion resistors.

Figure 1:
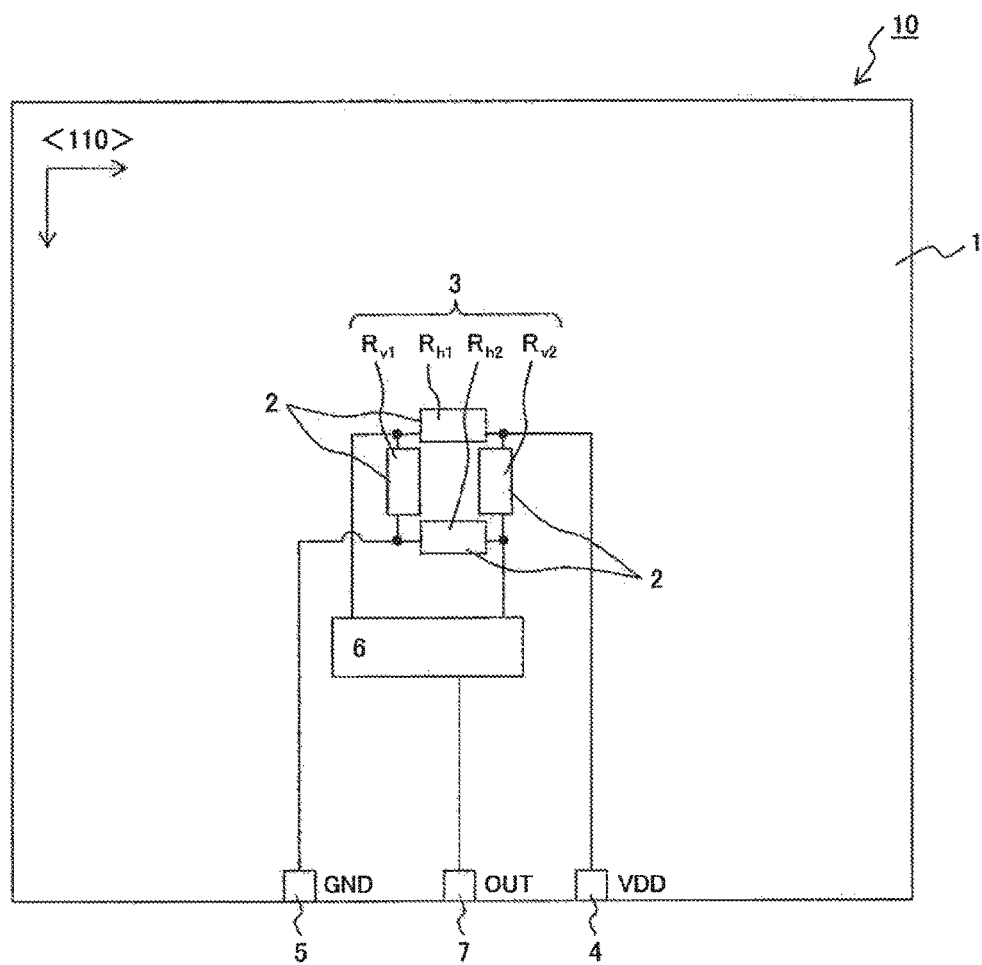
FIG. 1 is a schematic plan view illustrating an overview of a conventional semiconductor strain sensor used for an experiment.

FIG. 1 is a schematic plan view illustrating an overview of the Wheatstone bridge which uses the four P-type diffusion resistors mounted on a conventional semiconductor strain sensor. A description will be briefly given regarding a configuration and a function of a conventional semiconductor strain sensor 10 with reference to FIG. 1. The semiconductor strain sensor 10 includes a plurality of P-type diffusion resistors 2 formed on a surface of a monocrystalline silicon substrate 1, and the plurality of P-type diffusion resistors 2 are connected to each other serving as four bridge resistors $R_{v1}$, $R_{v2}$, $R_{h1}$ and $R_{h2}$ to form a Wheatstone bridge 3. The Wheatstone bridge 3 is connected to a power supply terminal 4 and a ground terminal 5 and is configured such that directions of current flowing to the four bridge resistors $R_{v1}$, $R_{v2}$, $R_{h1}$ and $R_{h2}$ become a direction <110> of the monocrystalline silicon substrate 1 and a direction perpendicular thereto. Incidentally, silicon is a cubic crystal.

When strain is applied to the semiconductor strain sensor 10 in the direction <110> of the monocrystalline silicon substrate 1 and/or in the direction perpendicular thereto, each resistance value of the impurity diffusion resistors 2 (that is, the four bridge resistors $R_{v1}$, $R_{v2}$, $R_{h1}$ and $R_{h2}$) is changed, and a potential difference is generated in output of bridge voltage. This potential difference is amplified by an amplifier circuit 6, which is formed inside the monocrystalline silicon substrate 1, and is taken out from an output terminal 7 as an electrical signal. In this manner, the semiconductor strain sensor 10 can output the electrical signal in accordance with the amount of strain applied to a region (strain detection region) in which the Wheatstone bridge 3 is formed. At this time, an output voltage OUT of the semiconductor strain sensor 10 can be expressed as $$\text{VOUT} = \text{GAIN} \cdot \text{VDD}((a-b)\varepsilon x - (a-b)\varepsilon y)/2 \quad (1)$$

(wherein, GAIN is an amplification factor of the amplifier circuit, a is a gauge factor in a direction parallel with current, b is a gauge factor in a direction perpendicular to current, VDD is a power supply voltage, $\varepsilon x$ is an X-direction strain, and $\varepsilon y$ is a Y-direction strain). At this time, when the P-type diffusion resistor is used as the resistor forming the bridge, the gauge factor in the direction parallel with current is equal to the gauge factor in the direction perpendicular to current, and a and b of the above-described Formula (1) can be expressed by Formula (2).

$$a = -b \quad (2)$$

Thus, Formula (1) can be expressed by Formula (3).

$$\text{VOUT} = \text{GAIN} \cdot \text{VDD} \cdot a \cdot (\varepsilon x - \varepsilon y) \quad (3)$$

That is, it is understood that the output voltage of the conventional semiconductor strain sensor using the P-type diffusion resistor is proportional to a difference between the X-direction strain and the Y-direction strain generated in the semiconductor strain sensor. Thus, it is known that the semiconductor strain sensor using the P-type diffusion resistor exhibits a favorable temperature dependence by cancelling influence that is given when an object to be measured is isotropically changed in the X direction and the Y direction through expansion or contraction due to heat.

Figure 2:
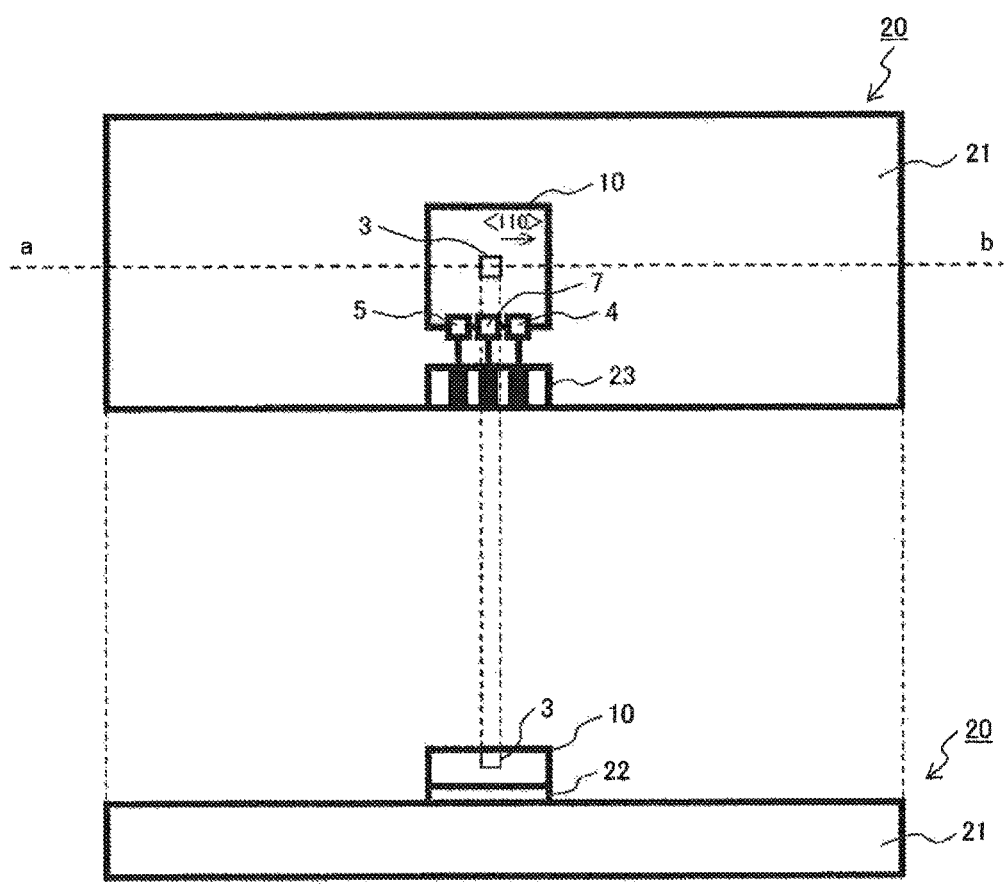
FIG. 2 is a schematic plan view illustrating an overview of a pseudo pressure sensor used for an experiment and a schematic cross-sectional view taken along a line a-b.

FIG. 2 is a schematic plan view illustrating an overview of a pseudo pressure sensor used for an experiment and a schematic cross-sectional view taken along a line a-b illustrated in the schematic plan view. As illustrated in FIG. 2, the pseudo pressure sensor 20 is configured such that the semiconductor strain sensor 10 is bonded to a substantially central position of a metal plate 21, which imitates the diaphragm, with a solder bonding layer 22 interposed therebetween. A pressure sensor for an automobile engine is provided under high-temperature environment (for example, about 120 to 130° C.), and thus, the diaphragm and the semiconductor strain sensor are generally bonded by solder bonding instead of bonding using an organic adhesive. The metal plate 21 is provided with a terminal base 23, and the power supply terminal 4, the ground terminal 5, and the output terminal 7 of the semiconductor strain sensor 10 are connected thereto.

Figure 3A:
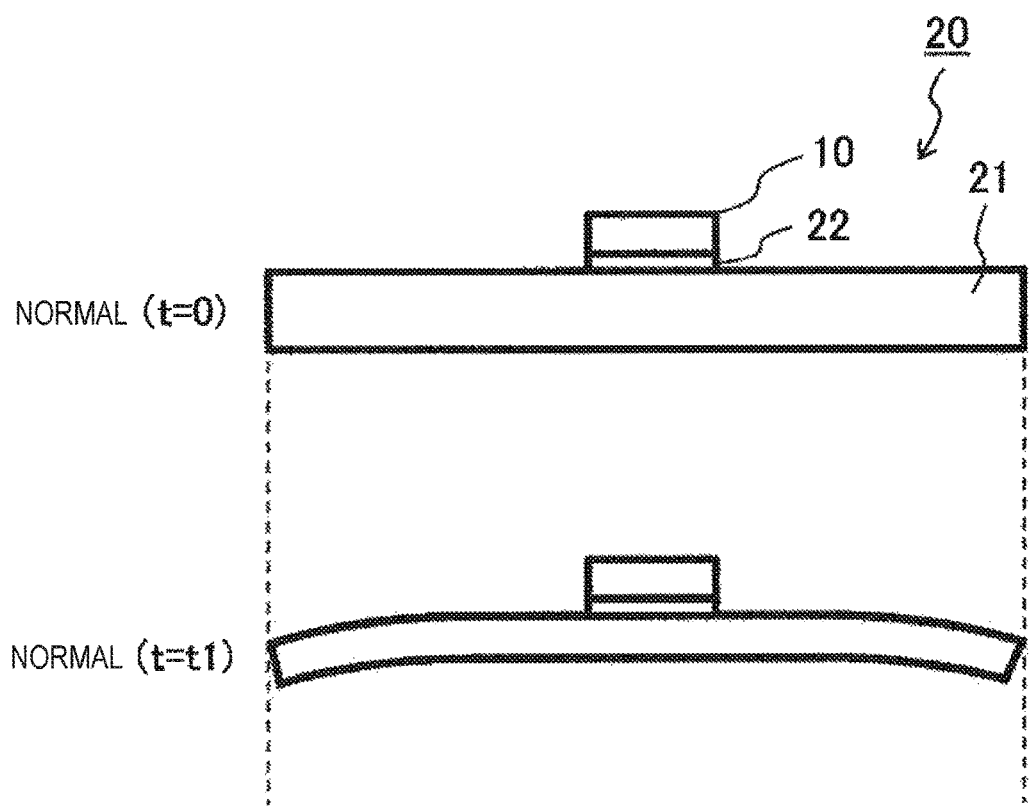
FIG. 3A is a schematic cross-sectional view illustrating an aspect of deformation of the pseudo pressure sensor that is normally mounted.
Figure 3B:
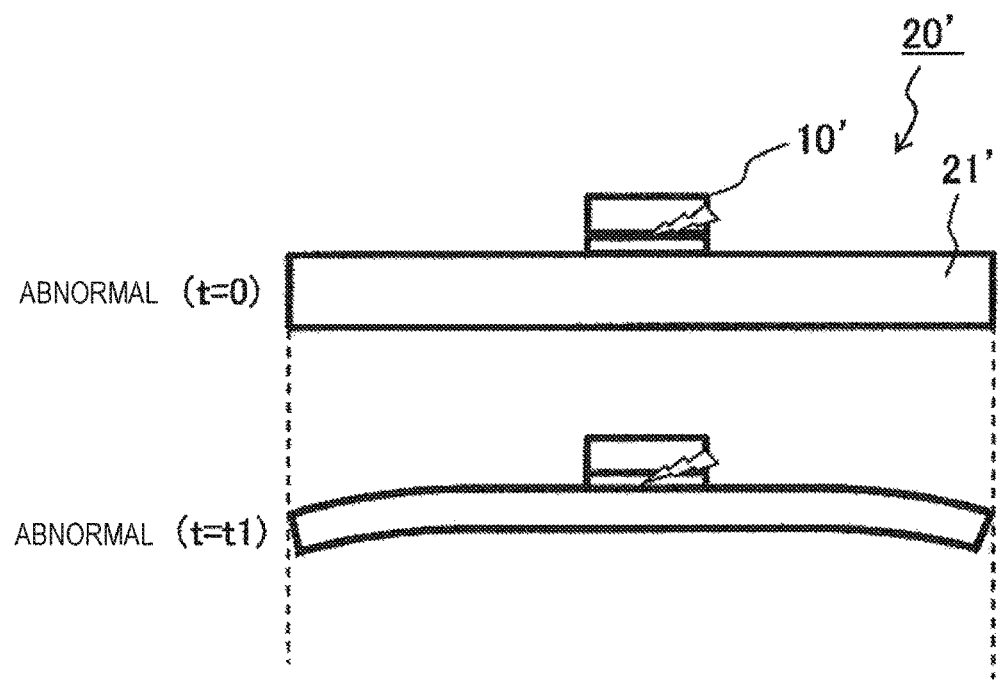
FIG. 3B is a schematic cross-sectional view illustrating an aspect of deformation of the pseudo pressure sensor of which a part (mainly a chip end portion) is damaged because a part of a silicon chip exceeds an allowable amount of strain when being mounted.
Figure 3C:
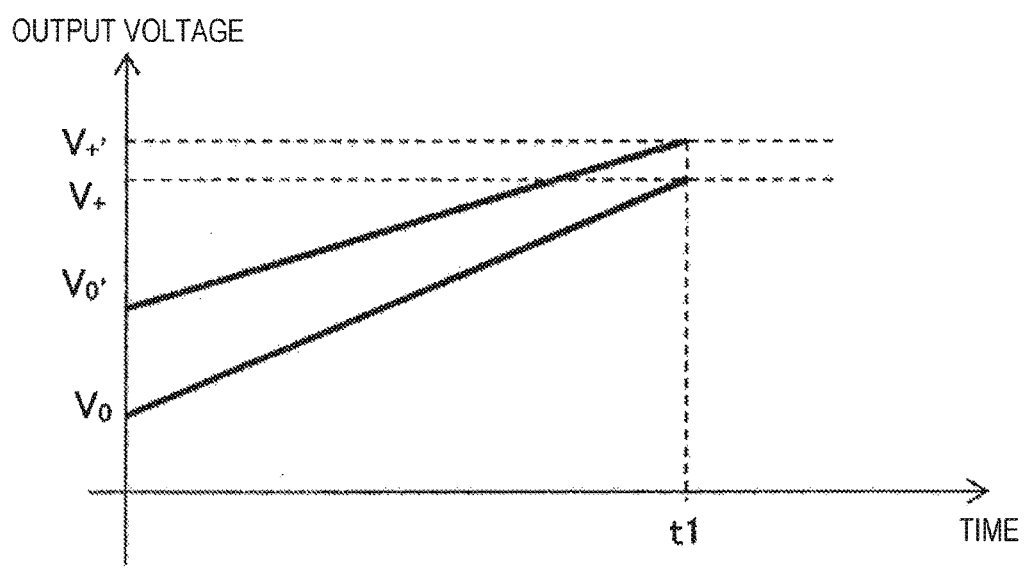
FIG. 3C is a graph illustrating a relationship between an output voltage of a semiconductor strain sensor and time in the pseudo pressure sensor that is normally mounted and the pseudo pressure sensor that is partially damaged.

Next, the experiment and a result thereof will be described with reference to FIGS. 3A to 3C. FIG. 3A is a schematic cross-sectional view illustrating an aspect of deformation of the pseudo pressure sensor 20 that is normally mounted. FIG. 3B is at schematic cross-sectional view illustrating an aspect of deformation of the pseudo pressure sensor 20 of which a part (mainly a chip end portion) is damaged because a part of the silicon chip exceeds an allowable amount of strain when being mounted. FIG. 3C is a graph illustrating a relationship between each output voltage of the semiconductor strain sensors 10 and 10' and time. In the experiment, an initial state where stress is not applied to the metal plate is set at "time t=0", and an output voltage of the semiconductor strain sensor 10 and an output voltage of semiconductor strain sensor 10' at this time are set as $V_0$ and $V_0'$, respectively.

Thereafter, when a bending stress is applied to the metal plates 21 and 21' of the pseudo pressure sensors 20 and 20' over "time t=t1", strain is generated in the metal plates 21 and 21'. Each strain of the metal plates 21 and 21' is propagated to the semiconductor strain sensors 10 and 10' via the solder bonding layer, and the output voltage of the semiconductor strain sensor 10 is changed from Vo to an output voltage $V_+$ via a transient, state, and the output voltage of the semiconductor strain sensor 10' is changed from $V_0'$ to an output voltage $V_+'$ via a transient state. At this time, the pseudo pressure sensor 20' in which a part of the silicon chip is damaged show a result where the initial offset is slightly great and a voltage variation at the time of application of stress is slightly smaller as compared to those of the normal pseudo pressure sensor 20, but it has been understood that it is difficult to notice the damage of the silicon chip only by observing the values of the pseudo pressure sensor 20'. This means that, when each strain amount in the X direction and the Y direction increases together, it is difficult to perceive such a phenomenon only with the output of the Wheatstone bridge even if an absolute value of the output of the Wheatstone bridge using the P-type diffusion resistor is large enough to destroy a part of the silicon chip as in the pseudo pressure sensor 20' in order to detect the difference between the X direction and the Y direction.

As a result of the study, it has been found out that is it necessary to improve the reliability of the silicon chip and the mounting interface to a level that satisfies automotive quality by simultaneously measuring whether each absolute value in the X direction and the Y direction exceeds each allowable strain amount at the silicon chip or the mounting interface using the same silicon substrate as the semiconductor strain sensor in which the Wheatstone bridge using the P-type diffusion resistor, which detects the difference between the respective strain amount in the X direction and the Y direction and has the excellent temperature dependence, is arranged. The present invention is completed as the result of the study.

The present invention can apply the following improvements and alterations in the above-described mechanical quantity measurement device according to the present invention.

(i) A main surface of a semiconductor substrate is a surface {100} of monocrystalline silicon.

(ii) The x-axis direction and the y-axis direction of the semiconductor substrate match the direction <110> of the silicon substrate. The Wheatstone bridge that detects the difference between the respective strain amount in the x-axis direction and the y-axis direction is configured of two P-type diffusion resistors, which cause current to flow in the direction <110>, have the longitudinal direction formed in the y-axis direction, and are arranged in a direction to cause current to flow in parallel with the y-axis, and two P-type diffusion resistors which cause current to flow in the direction <110>, have the longitudinal direction formed in the x-axis direction, and are arranged in a direction to cause current to flow in parallel with the x-axis. (iii) The Wheatstone bridge that measures the absolute value of the strain amount in the x-axis direction and the absolute value of the strain amount in the y-axis direction are formed using two Wheatstone bridges. One of the Wheatstone bridges is configured of two polysilicon resistors, which cause current to flow in the direction <110>, have the longitudinal direction formed in the y-axis direction, and are arranged in a direction to cause current to flow in parallel with the y-axis, and two P-type diffusion resistors which cause current to flow in a direction <100>, have each longitudinal direction formed in each direction inclined from each of the x-axis direction and the y-axis direction by 45 degree, and cause the current to flow in parallel with each direction inclined from each of the x-axis direction and the y-axis direction by 45 degree. The other Wheatstone bridges is formed, of two polysilicon resistors, which cause current to flow in the direction <110>, have the longitudinal direction formed in the x-axis direction, and are arranged in a direction to cause current to flow in parallel with the x-axis, and two P-type diffusion resistors which cause current to flow in a direction <100>, have each longitudinal direction formed in each direction inclined from each of the x-axis direction and the y-axis direction by 45 degree, and cause the current to flow in parallel with each direction inclined from each of the x-axis direction and the y-axis direction by 45 degree.

(iv) The resistors forming the Wheatstone bridge are arrayed to be adjacent to each other at an interval that is equal to or shorter than a length of the resistor in the longitudinal direction.

(v) A correction calculation circuit, which performs correction calculation of the strain amount based on each output from the plurality of Wheatstone bridges, is further provided on the semiconductor substrate in which the Wheatstone bridge is formed.

In addition, a pressure sensor according to the present invention is a pressure sensor in which a semiconductor strain sensor is bonded onto a metallic diaphragm, and the semiconductor strain sensor is configured using the above-described mechanical quantity measurement device according to the present invention as described above.

The present invention can apply the following improvements and alterations in the above-described pressure sensor according to the present invention.

(vi) The semiconductor strain sensor is bonded to the metallic diaphragm by solder bonding.

(vii) The pressure sensor is used as a pressure sensor for an automobile engine.

Hereinafter, embodiments of the present invention will be described with reference to the drawings. However, the present invention is not limited to the embodiments exemplified herein, and combinations or improvements can be appropriately made within a range not departing from a technical idea of the invention. Incidentally, the same parts and portions will be denoted by the same reference signs, and redundant descriptions thereof will be omitted.

EXAMPLE 1

Figure 4:
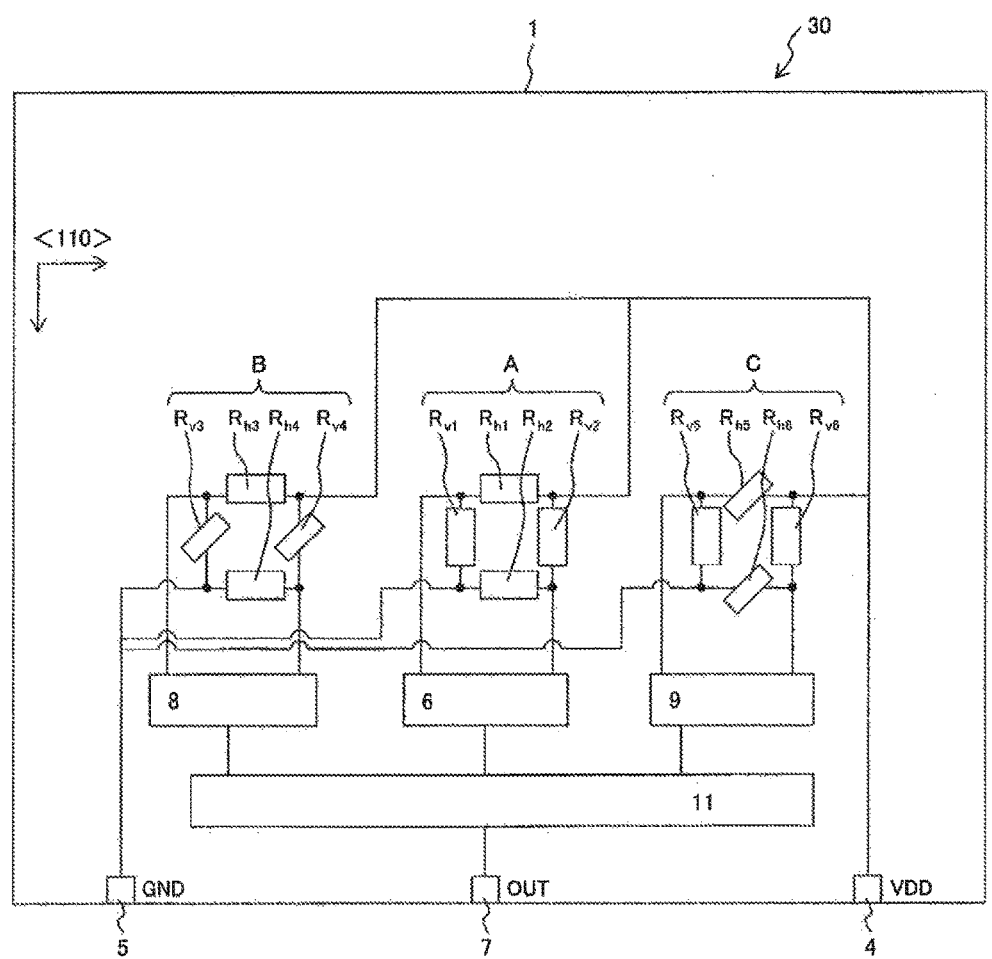
FIG. 4 is a schematic plan view illustrating an overview of a mechanical quantity measurement device according to a first embodiment.

Here, a description will be given regarding a technical idea of a mechanical quantity measurement device according to a first embodiment of the present invention with reference to FIGS. 4 to 7. FIG. 4 is a schematic plan view illustrating an overview of the mechanical quantity measurement device according to the first embodiment.

As illustrated in FIG. 4, a mechanical quantity measurement device 30 (semiconductor strain sensor) according to the first embodiment includes three Wheatstone bridges A, B and C which are arranged on a surface of a semiconductor substrate (for example, the monocrystalline silicon substrate 1) to be adjacent to each other. The Wheatstone bridge A is formed of four resistors $R_{v1}$, $R_{v2}$, $R_{h1}$ and $R_{h2}$. Similarly, the adjacent Wheatstone bridge B is formed of four resistors $R_{v3}$, $R_{v4}$, $R_{h3}$ and $R_{h4}$, and the Wheatstone bridge C is formed of $R_{v5}$, $R_{v6}$, $R_{h5}$ and $R_{h6}$. The Wheatstone bridges A, B and C are preferably formed to be sufficiently small in relation to a size of the monocrystalline silicon substrate 1.

In the present embodiment, for example, the size of the monocrystalline silicon substrate 1 is formed in a square having one side of 4 mm, and each size of the Wheatstone bridges A, B and C is formed in a square having one side of 0.2 mm.

The Wheatstone bridge A is configured of the resistors $R_{h1}$ and $R_{h2}$ whose resistance values are changed in accordance with the strain generated in the X-axis direction of the semiconductor substrate 1, and the resistors $R_{v1}$ and $R_{v2}$ whose resistance values are changed in accordance with the strain generated in the Y-axis direction in order to output the difference between the difference in the strain generated in the strain generated in the X-axis direction and the Y-axis direction. These resistors $R_{v1}$, $R_{v2}$, $R_{h1}$ and $R_{h2}$ are formed using P-type impurity diffusion resistors. To be more specific, the resistors $R_{v1}$ and $R_{v2}$ are the P-type diffusion resistors that have the longitudinal direction in the Y-axis direction and are arranged in a direction to cause current to flow in parallel with the Y-axis. In addition, the resistors $R_{h1}$ and $R_{h2}$ are the P-type diffusion resistors that have the longitudinal direction in the X-axis direction and are arranged in the direction to cause current to flow in parallel with the X-axis. In addition, the resistors $R_{v1}$, $R_{v2}$, $R_{h1}$ and $R_{h2}$ forming the Wheatstone bridge A are arranged substantially at the center (middle) of the semiconductor substrate 1.

The Wheatstone bridges B and C are configured to detect an absolute value of the strain generated in the X-axis direction and an absolute value of the strain generated in the Y-axis direction by calculating each output voltage thereof. Here, the resistors $R_{v3}$ and $R_{v4}$ among the four resistors $R_{v3}$, $R_{v4}$, $R_{h3}$ and $R_{h4}$, which form the Wheatstone bridge B, are P-type impurity diffusion resistors, and each longitudinal direction thereof is the direction <100> inclined from each of the X-axis and the Y-axis direction by 45 degree. On the other hand, the resistors $R_{h3}$ and $R_{h4}$ are polysilicon resistors, and each longitudinal direction thereof is the direction parallel with the X-axis. In addition, the resistors $R_{v3}$, $R_{v4}$, $R_{h3}$ and $R_{h4}$, which form Wheatstone bridge B, are arranged adjacently to the resistors $R_{v1}$, $R_{v2}$, $R_{h1}$ and $R_{h2}$ which form the Wheatstone bridge A.

The resistor $R_{h5}$ and $R_{h6}$ among the four resistors $R_{v5}$, $R_{v6}$, $R_{h5}$ and $R_{h6}$, which form the Wheatstone bridge C, are P-type impurity diffusion resistors, and each longitudinal direction thereof is the direction <100> inclined from each of the X-axis and the Y-axis direction by 45 degree. On the other hand, the resistors $R_{v5}$ and $R_{v6}$ are polysilicon resistors, and each longitudinal direction thereof is the direction parallel with the Y-axis. In addition, the resistors $R_{v5}$, $R_{v6}$, $R_{h5}$ and $R_{h6}$, which form Wheatstone bridge C, are arranged adjacently to the resistors $R_{v1}$, $R_{v2}$, $R_{h1}$ and $R_{h2}$ which form the Wheatstone bridge A.

As described above, the Wheatstone bridges A, B and C are arranged to be adjacent to each other, and the respective resistors have all the four elements of bridge resistors. Thus, each of the Wheatstone bridges A, B and C has a characteristic that temperature distribution becomes substantially constant in its own strain detection region (strictly speaking, in the region in which the impurity diffusion resistors forming the corresponding Wheatstone bridge are formed) when considering thermal resistance of the semiconductor substrate.

Each of the Wheatstone bridges A, B and C is connected to the power supply terminal 4 and the ground terminal 5. A signal (potential difference of bridge voltage) to be obtained from the Wheatstone bridge A is amplified by the amplifier circuit 6 formed inside the monocrystalline silicon substrate 1. Signals to be obtained from the Wheatstone bridges B and C are amplified by amplifier circuits 8 and 9 formed inside the monocrystalline silicon substrate 1. The signals amplified by the amplifier circuits 6, 8 and 9 are input to a correction calculation circuit 11 formed inside the monocrystalline silicon substrate 1. In the correction calculation circuit 11, correction calculation to calculate a difference between a strain amount in the X-axis direction and a strain amount in the Y-axis direction is executed using the voltage detected by the Wheatstone bridge A. In addition, correction calculation to calculate an absolute value of the strain amount in the X-axis direction and an absolute value of the strain amount in the Y-axis direction is executed in the correction calculation circuit 11 using the voltages detected by the Wheatstone bridges B and C. When the strain amount in the X-axis direction and the strain amount in the Y-axis direction are equal to or smaller than an allowable value, a signal in accordance with the difference between the strain amount in the X-axis direction and the strain amount in the Y-axis direction is taken out from the output terminal 7. When at least any one of the strain amount in the X-axis direction and the strain amount in the Y-axis direction is the strain amount that exceeds the allowable value, a voltage to notify an abnormality is output from the output terminal 7. (Details of the correction calculation will be described later). Accordingly, when the strain exceeding the allowable strain amount is generated at the solder bonding layer to which the mechanical quantity measurement device 30 (the semiconductor strain sensor) is bonded or the silicon substrate, it is possible to notify the outside of such a state in the form of the abnormal voltage.

Next, the correction calculation will be described. The Wheatstone bridge A is configured of the four P-type diffusion resistors which cause current to flow in the direction <110>. Thus, the resistance value thereof is changed depending on the strain generated in the X-axis direction and the Y-axis direction. An output voltage at this time can be expressed by Formula (3) as described above with reference to FIG. 1.

That is, this indicates that the output, which is proportional to a difference between the strain amount εx applied in the X-axis direction and the strain amount εy applied in the Y-axis direction, is detected.

Meanwhile, the resistors $R_{v3}$ and $R_{v4}$ are the P-type diffusion resistors in the Wheatstone bridge B, and the longitudinal direction thereof is arranged in the direction <100>. The P-type diffusion resistor exhibits an extremely low sensitivity with respect to the strain generated in the X-axis direction and the Y-axis direction when current flows in the direction <100>. Thus, even if the strain is generated in the X-axis direction and the Y-axis direction, the resistance values $R_{v3}$ and $R_{v4}$ are not changed. On the other hand, the resistors $R_{h3}$ and $R_{h4}$ forming the Wheatstone bridge B are the polysilicon resistors that cause current to flow in the direction <110> and cause current to flow in parallel with the X-axis direction. Similarly, the resistors $R_{h5}$ and $R_{h6}$ are the P-type diffusion resistors in the Wheatstone bridge C, and the longitudinal direction thereof is arranged in the direction <100>. On the other hand, the resistors $R_{v5}$ and $R_{v6}$ are the polysilicon resistors, and cause the current to flow in the direction in parallel with the Y-axis direction.

At this time, a sensitivity to strain generated in the flow direction of current and a sensitivity to strain generated in a direction perpendicular to the current are different in the polysilicon resistor. That is, it is possible to detect each strain separated between the X-axis direction and the Y-axis direction in the Wheatstone bridges B and C by changing the direction of current flowing to the polysilicon resistor. The X-axis direction strain and the Y-axis direction strain at this time are expressed using an output voltage VOUTB of the Wheatstone bridge B, an output voltage VOUTC of the Wheatstone bridge C, a gauge factor A which is parallel with the current flow direction of the polysilicon resistor, and a gauge factor B which is perpendicular to the current flow direction, Formulas (4) and (5) can be derived.

$$\varepsilon_x = (A_2 - B_2))(A \cdot (\text{VOUT}B/\text{VDD}) - B \cdot (\text{VOUT}C/\text{VDD}) \quad (4)$$

$$\varepsilon_y = (A_2 - B_2))(A \cdot (\text{VOUT}B/\text{VDD}) - B \cdot (\text{VOUT}C/\text{VDD}) \quad (5)$$

At this time, the gauge factors A and B of the polysilicon resistor have a greater temperature dependence than the above-described gauge factor a of the P-type diffusion resistor, and the respective strain amount εx and εy, obtained by subtracting Formulas (4) and (5) have an error of about 30% at most as compared to strain that is actually generated. Thus, the best mode is Formula (3) where only the P-type diffusion resistor is used for the mechanical quantity measurement device in order to obtain the output in accordance with the difference between the strain amount generated in the X-axis direction and the strain amount generated in the Y-axis direction. In this regard, it is necessary to arrange the three Wheatstone bridges on the same substrate, and obtain the difference between the strain amount in the X-axis direction and the strain amount in the Y-axis direction, the absolute value of the strain amount in the X-axis direction, and the absolute value of the strain amount in the Y-axis direction.

It is possible to detect the difference between the strain amount in the X-axis direction and the strain amount in the Y-axis direction with a favorable temperature dependence and to individually approximate the strain generated in each of the X-axis direction and the Y-axis direction using the three Wheatstone bridges arranged on the above-described mechanical quantity measurement device.

Next, a description will be given regarding an effect of the mechanical quantity measurement device that is secondarily generated according to the present invention. Based on the above description, the mechanical quantity measurement device can be safely stopped by setting the voltage, which notifies the output terminal 7 of the generation of strain exceeding the allowable strain, to a GND potential, for example, in a case where each value of Formulas (4) and (5) is the value exceeding the allowable strain when the allowable strain amount at the silicon or the mounting interface illustrated in FIG. 3 and each approximate value of the strain amount obtained from Formulas (4) and (5) are compared by the correction circuit 11 of FIG. 4. The voltage that notifies the generation of strain exceeding the allowable strain is set to a value outside an operating voltage range of the output voltage that is output from the output terminal 7 when the mechanical quantity measurement device normally operates.

In the present Example, the three Wheatstone bridges are configured using the twelve resistors. The first Wheatstone bridge A is configured of the first Y-axis-direction resistor $R_{v1}$, the second Y-axis-direction resistor $R_{v2}$, the first X-axis-direction resistor $R_{h1}$, and the second X-axis-direction resistor $R_{h2}$. The second Wheatstone bridge B is configured of the first polysilicon resistor $R_{h3}$, the second polysilicon resistor $R_{h4}$, the first inclination (in the direction <100>) resistor $R_{v3}$, the second inclination (in the direction <100>) resistor $R_{v4}$. The third Wheatstone bridge C is configured of the third polysilicon resistor $R_{v5}$, the fourth polysilicon resistor $R_{v6}$, the third inclination (in the direction <100>) resistor $R_{h5}$, and the fourth inclination (in the direction <100>) resistor $R_{h6}$.

Further, the Wheatstone bridges A, B and C, the power supply terminal 4, the ground terminal 5, the output terminal 7, the amplifier circuits 6, 8 and 9, and the correction circuit 11 are formed on the main surface of the semiconductor substrate 1.

EXAMPLE 2

Figure 5:
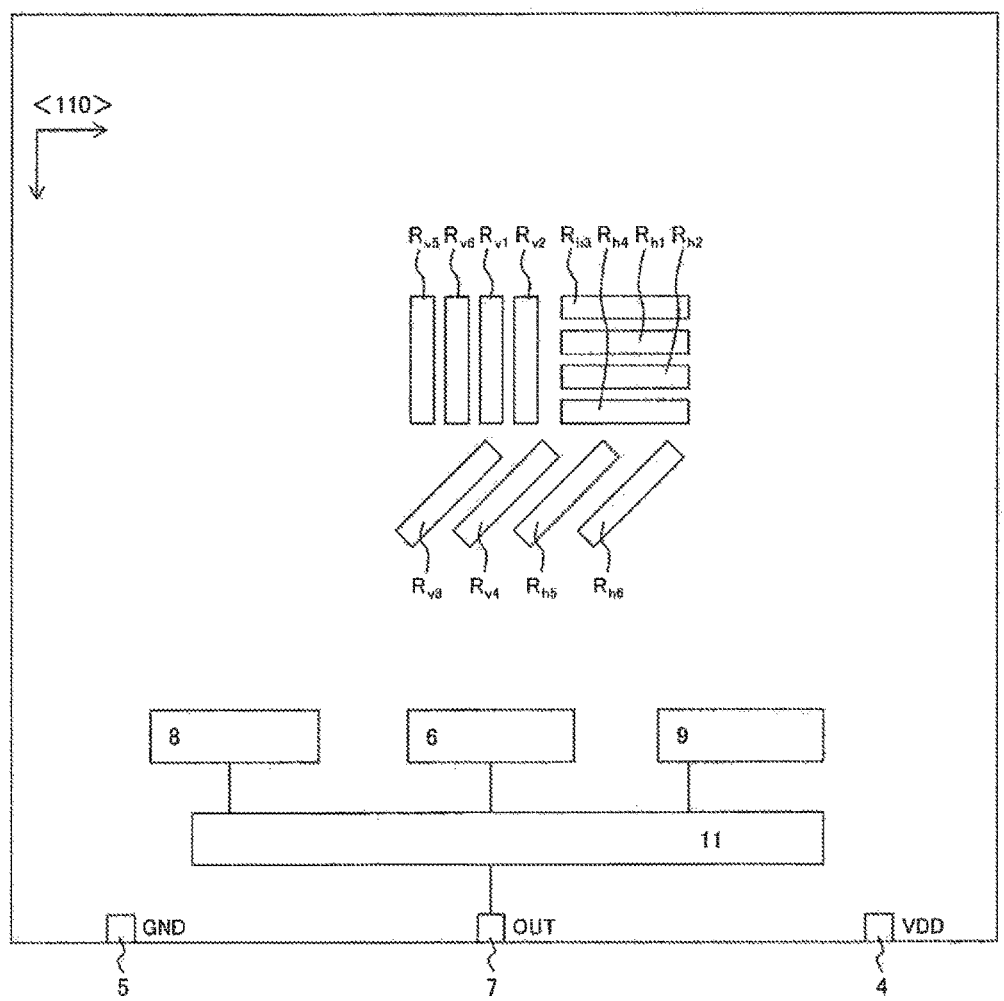
FIG. 5 is a schematic plan view illustrating an overview of a mechanical quantity measurement device according to a second embodiment.

Here, another example of the above-described first embodiment will be described with reference to FIG. 5. FIG. 5 illustrates an overall view of a mechanical quantity measurement device according to a second embodiment. For example, resistors of the Wheatstone bridges A, B and C illustrated in the first embodiment are arranged near the center of a chip such that the resistors are arranged to be adjacent to each other. Incidentally, the schematic plan view of FIG. 5 does not illustrate details of a wiring (for example, a wiring between impurity diffusion resistors) in order to simplify the drawing.

As illustrated in FIG. 5, the respective resistors $R_{v1}$, $R_{v2}$, $R_{h1}$ and $R_{h2}$, which form the Wheatstone bridge A according to the present embodiment, are arranged at a center portion of the chip, and the respective resistors forming the Wheatstone bridges B and C are arranged to be adjacent to the resistors $R_{v1}$, $R_{v2}$, $R_{h1}$ and $R_{h2}$ of the Wheatstone bridge A. Accordingly, there is an effect that isotropy inside a detection plane (in a region in which the impurity diffusion resistors forming the corresponding Wheatstone bridge are formed) is high, and there is little influence from manufacturing variations or temperature distribution of a semiconductor substrate.

EXAMPLE 3

Figure 6:
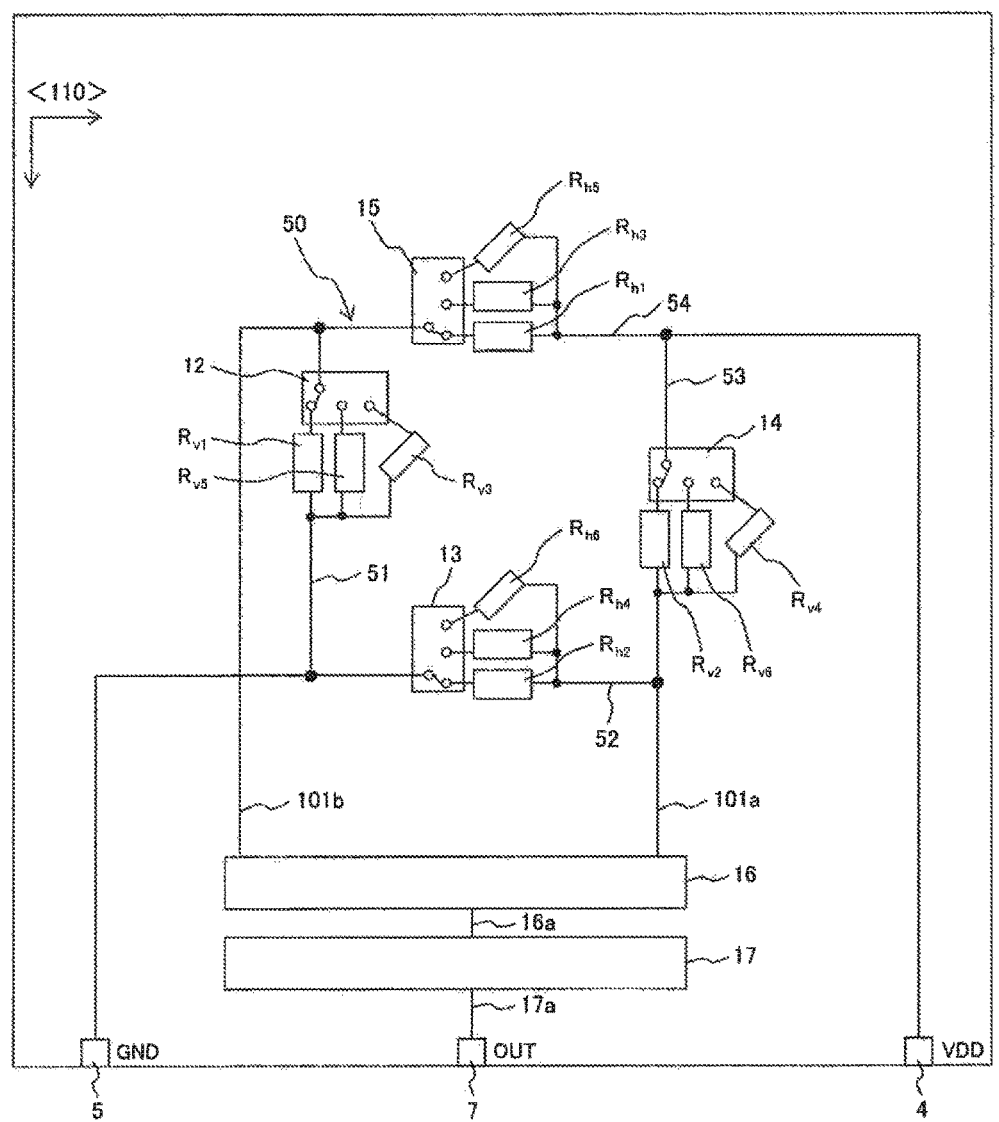
FIG. 6 is a schematic plan view illustrating an overview of a mechanical quantity measurement device according to a third embodiment, and illustrates a state where a connection mode is equivalent to a Wheatstone bridge A.

Here, another example of the above-described first and second embodiments will be described with reference to FIGS. 6 to 9. FIG. 6 is a diagram illustrating a connection mode of a Wheatstone bridge section of a mechanical quantity measurement device according to a third embodiment. Here, switch circuits, which select one among three wirings to be connected in a subsequent stage, are denoted by 12, 13, 14 and 15 in the drawing. The resistors $R_{v1}$, $R_{v3}$ and $R_{v5}$ forming the Wheatstone bridges A, B and C, respectively, are connected to the switch circuit 12, the resistors $R_{h2}$, $R_{h4}$ and $R_{h6}$ are connected to the switch circuit 13, the resistors $R_{v2}$, $R_{v4}$ and $R_{v6}$ are connected to the switch circuit 14, and the resistors $R_{h1}$, $R_{h3}$ and $R_{h5}$ are connected to the switch circuit 15. Output terminals 101a and '101b of the Wheatstone bridges A, B and C are connected to an amplifier circuit 16. An output 16a of the amplifier circuit 16 is connected to a correction circuit 17, and an output signal 17a of the correction circuit 17 is output from the output terminal 7.

In the present embodiment, one Wheatstone bridge circuit wiring 50 is provided to form the three Wheatstone bridges A, B and C described in the first embodiment. The first Y-axis-direction resistor $R_{v1}$, the third polysilicon resistor $R_{v5}$, and the first inclination (in the direction <100>) resistor $R_{v3}$ are provided in parallel via the first switch circuit 12 in a first wiring portion (first side) 51 of the Wheatstone bridge circuit wiring 50. Any one resistor among the resistors $R_{v1}$, $R_{v5}$ and $R_{v3}$ is selected by the first switch circuit 12, and is electrically connected to the first wiring portion 51. The second X-axis-direction resistor $R_{h2}$, the second polysilicon resistor $R_{h4}$, and the fourth inclination (in the direction <100>) resistor $R_{h6}$ are provided in parallel via the second switch circuit 13 in a second wiring portion (second side) 52. Any one resistor among the resistors $R_{h2}$, $R_{h4}$ and $R_{h6}$ is selected by the second switch circuit 13, and is electrically connected to the second wiring portion 52. The second Y-axis-direction resistor $R_{v2}$, the fourth polysilicon resistor $R_{v6}$, and the second inclination (in the direction <100>) resistor $R_{v4}$ are provided in parallel via the third switch circuit 14 in a third wiring portion (third side) 53. Any one resistor among the resistors $R_{v2}$, $R_{v6}$ and $R_{v4}$ is selected by the third switch circuit 14, and is electrically connected to the third wiring portion 53. The first X-axis-direction resistor $R_{h1}$, the first polysilicon resistor $R_{h3}$, and the third inclination (in the direction <100>) resistor $R_{h5}$ are provided in parallel via the fourth switch circuit 15 in a fourth wiring portion (fourth side) 54. Any one resistor among the resistors $R_{h1}$, $R_{h3}$ and $R_{h5}$ is selected by the fourth switch circuit 15, and is electrically connected to the fourth wiring portion 54.

FIG. 6 illustrates a state where the resistors $R_{v1}$, $R_{v2}$, $R_{h1}$ and $R_{h2}$ are selected by the switch circuits 12, 13, 14 and 15, respectively, and this state represents the same resistor connection mode as the above-described Wheatstone bridge A of Example 1.

Figure 7:
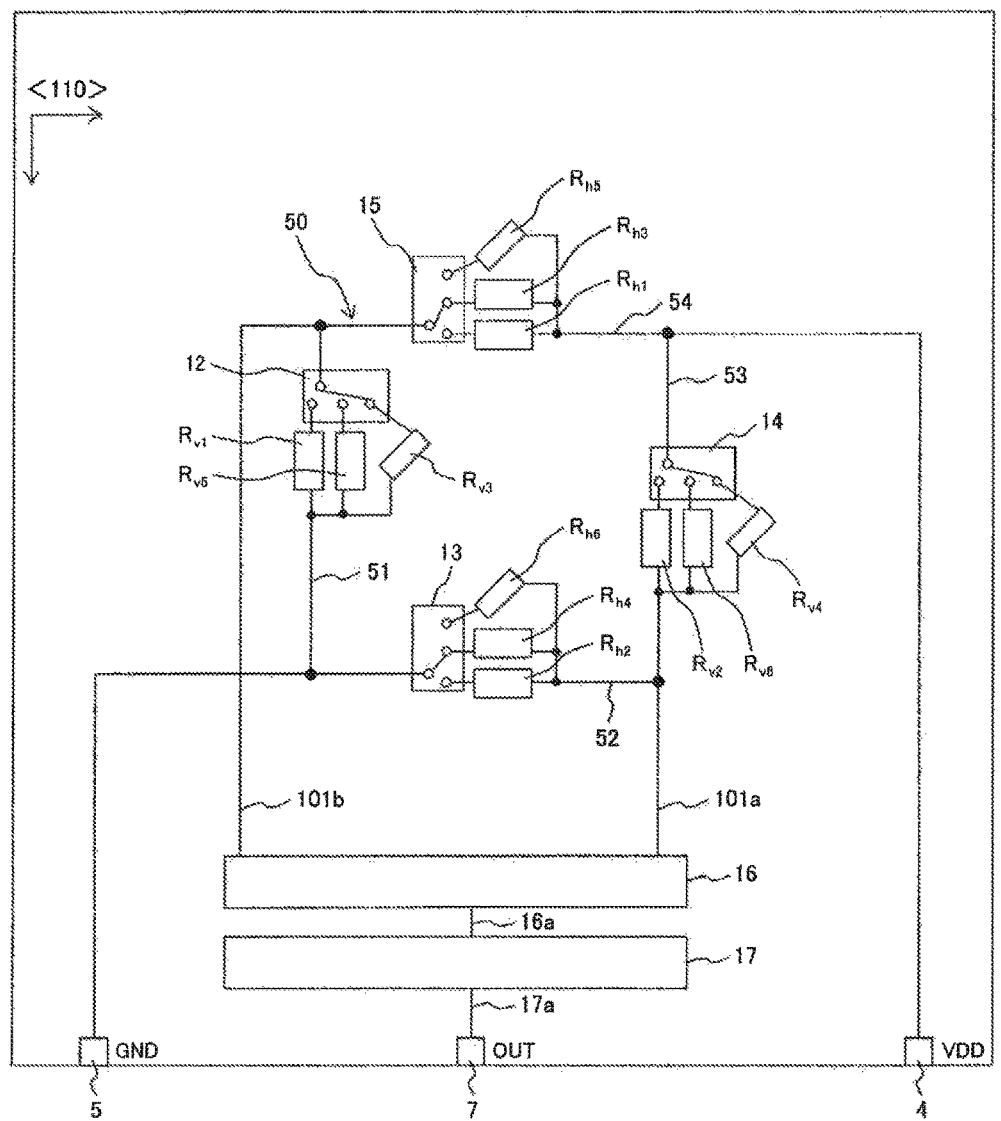
FIG. 7 is a schematic plan view illustrating an overview of the mechanical quantity measurement device according to the third embodiment, and illustrates a state where the connection mode is equivalent to a Wheatstone bridge B.

FIG. 7 illustrates a state where the resistors $R_{v3}$, $R_{v4}$, $R_{h3}$ and $R_{h4}$ are selected by the switch circuits 12, 13, 14 and 15, respectively, and this state represents the same resistor connection mode as the above-described Wheatstone bridge B of Example 1.

Figure 8:
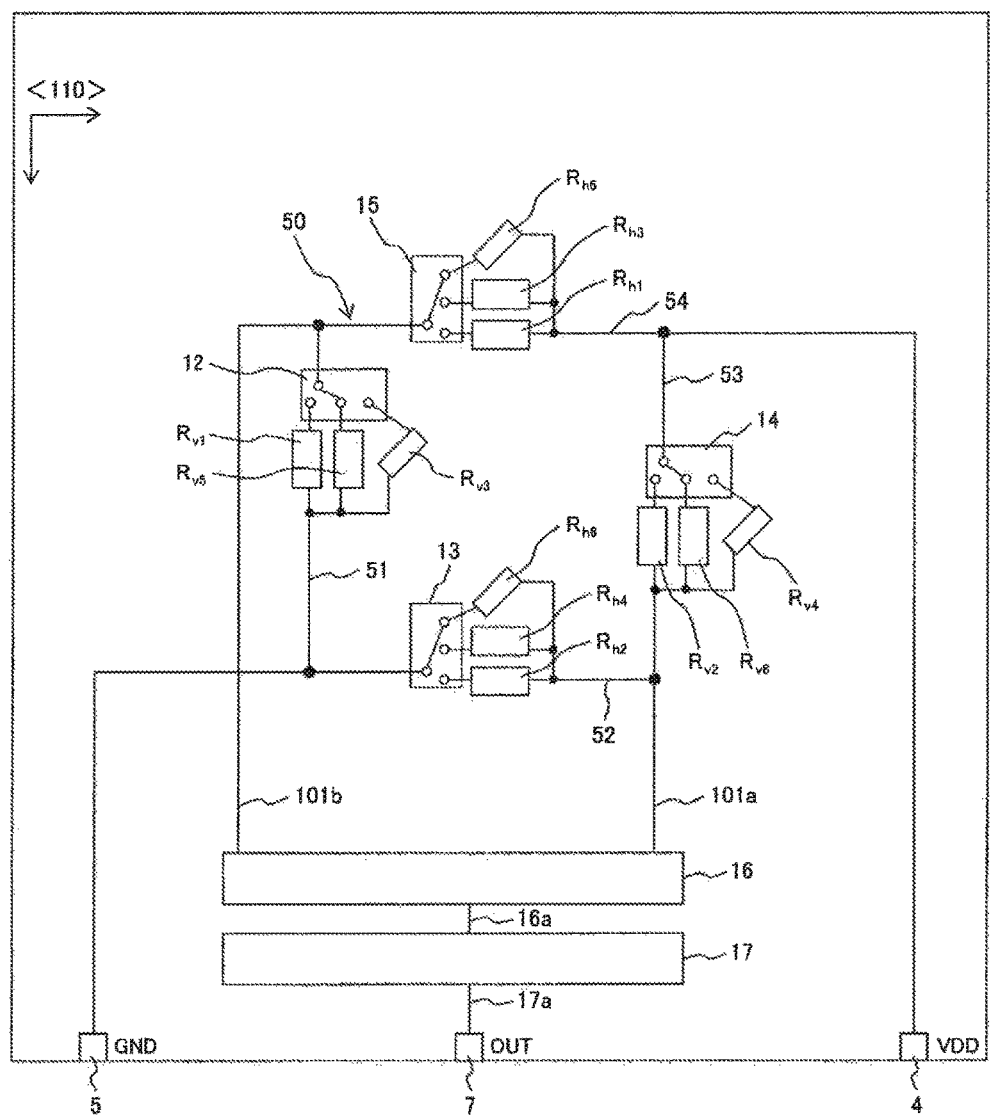
FIG. 8 is a schematic plan view illustrating an overview of the mechanical quantity measurement device according to the third embodiment, and illustrates a state where the connection mode is equivalent to a Wheatstone bridge C.

FIG. 8 illustrates a state where the resistors $R_{v5}$, $R_{v6}$, $R_{h5}$ and $R_{h6}$ are selected by the switch circuits 12, 13, 14 and 15, respectively, and this state represents the same resistor connection mode as the above-described Wheatstone bridge C of Example 1.

In addition, the amplifier circuit 16 has a function of amplifying an output voltage of the Wheatstone bridge, the correction circuit 17 calculates a difference between a strain amount generated in the X-axis direction and a strain amount generated in the Y-axis direction, an absolute value of the strain amount in the X-axis direction, and an absolute value of the strain amount in the Y-axis direction while controlling the switch circuits 12, 13, 14 and 15, and controls a voltage to be generated in the output terminal 7. Accordingly, the mechanical quantity measurement device having the same performance as those of Examples 1 and 2 is realized.

In the present embodiment, it is possible to realize each connection of the Wheatstone bridges A, B and C by controlling the switch circuits 12, 13, 14 and 15, and it is possible to use the common amplifier circuit 16 instead of the amplifier circuits 6, 8 and 9 provided in the subsequent stage of the respective Wheatstone bridges in Example 1. Accordingly, there is an effect that it is possible to reduce the influence from a variation in characteristics of the amplifier circuits 6, 8 and 9.

Figure 9:
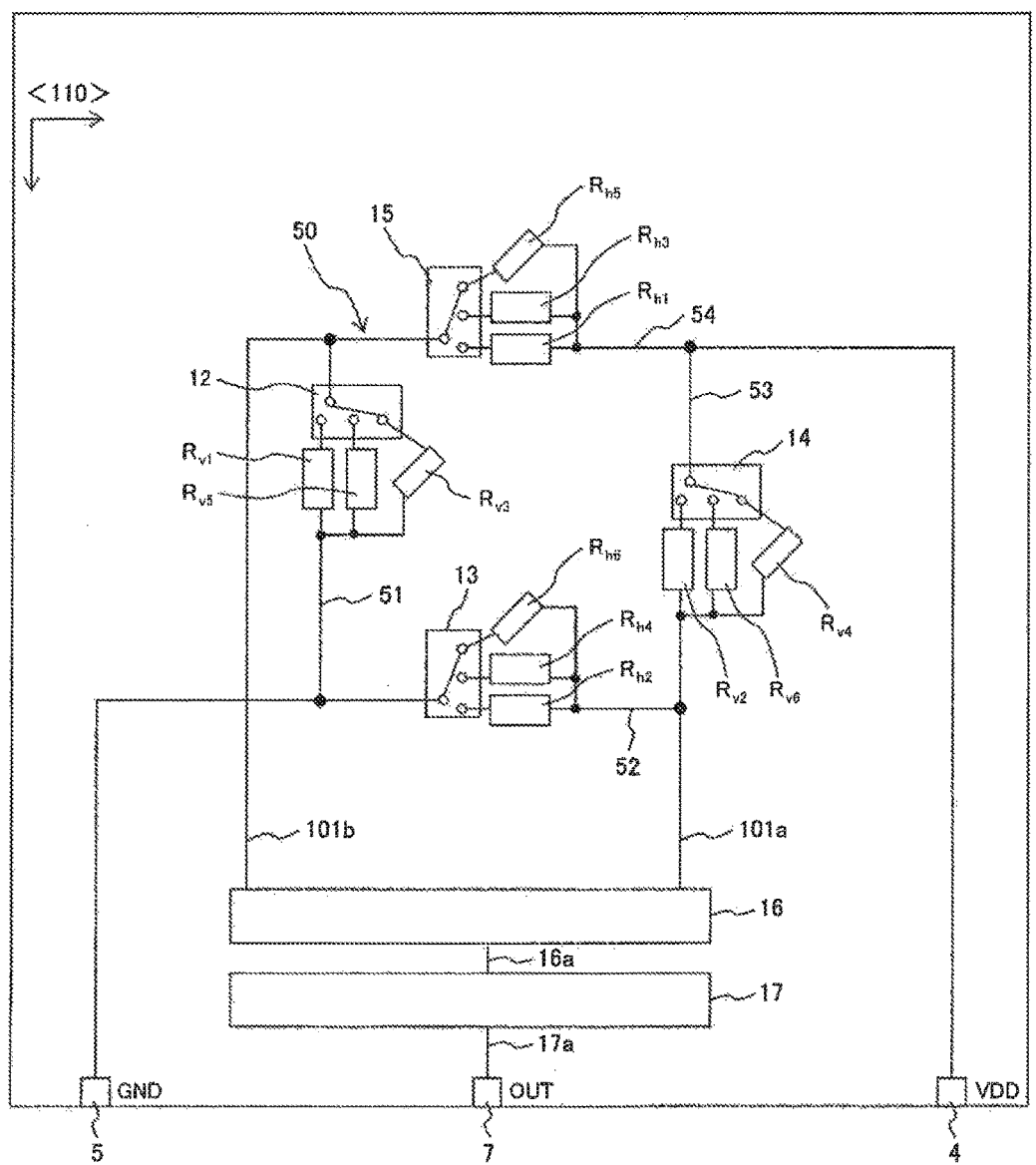
FIG. 9 is a schematic plan view illustrating an overview of the mechanical quantity measurement device according to the third embodiment, and illustrates a state where the connection mode does not depend on the amount of strain in the X-axis direction and the Y-axis direction and an output voltage of the Wheatstone bridge becomes zero.

In addition, when the switch circuits 12, 13, 14 and 15 are controlled as illustrated in FIG. 9, and the resistors $R_{v3}$, $R_{v4}$, $R_{h5}$, $R_{h6}$, which are arranged to have the longitudinal direction in the direction <100, are connected to each other, an output voltage of the Wheatstone bridge circuit constantly becomes zero regardless of the strain amount generated in the X-axis direction and the Y-axis direction, which is a secondary effect of the present embodiment. In this manner, when the above-described connection state is set in a state where each strain amount generated in the X-axis direction and the Y-axis direction is not known yet and it is confirmed that the output voltage of the Wheatstone bridge become substantially zero, it is possible to confirm the connection of the Wheatstone bridge including the switch circuit, and to realize the mechanical quantity measurement device with the higher reliability.

Incidentally, the Wheatstone bridges A, B and C, the power supply terminal 4, the ground terminal 5, the output terminal 7, the amplifier circuit 16, and the correction circuit 17 are formed on the main surface of the semiconductor substrate 1 in the present Example.

In addition, the Wheatstone bridge A may be configured as an independent Wheatstone bridge, and the Wheatstone bridges B and C may be configured using the common Wheatstone bridge circuit, wiring 50. Alternatively, any one of the Wheatstone bridges B and C may be configured as an independent Wheatstone bridge, and the other Wheatstone bridge and the Wheatstone bridge A may be configured using the common Wheatstone bridge circuit wiring 50. In these cases, the independently configured Wheatstone bridge and the Wheatstone bridge circuit wiring 50, which is configured by excluding the resistors of the independently configured Wheatstone bridge from the Wheatstone bridge circuit wiring 50, may be provided on the main surface of the semiconductor substrate 1 in FIGS. 6 to 9.

EXAMPLE 4

Figure 10:
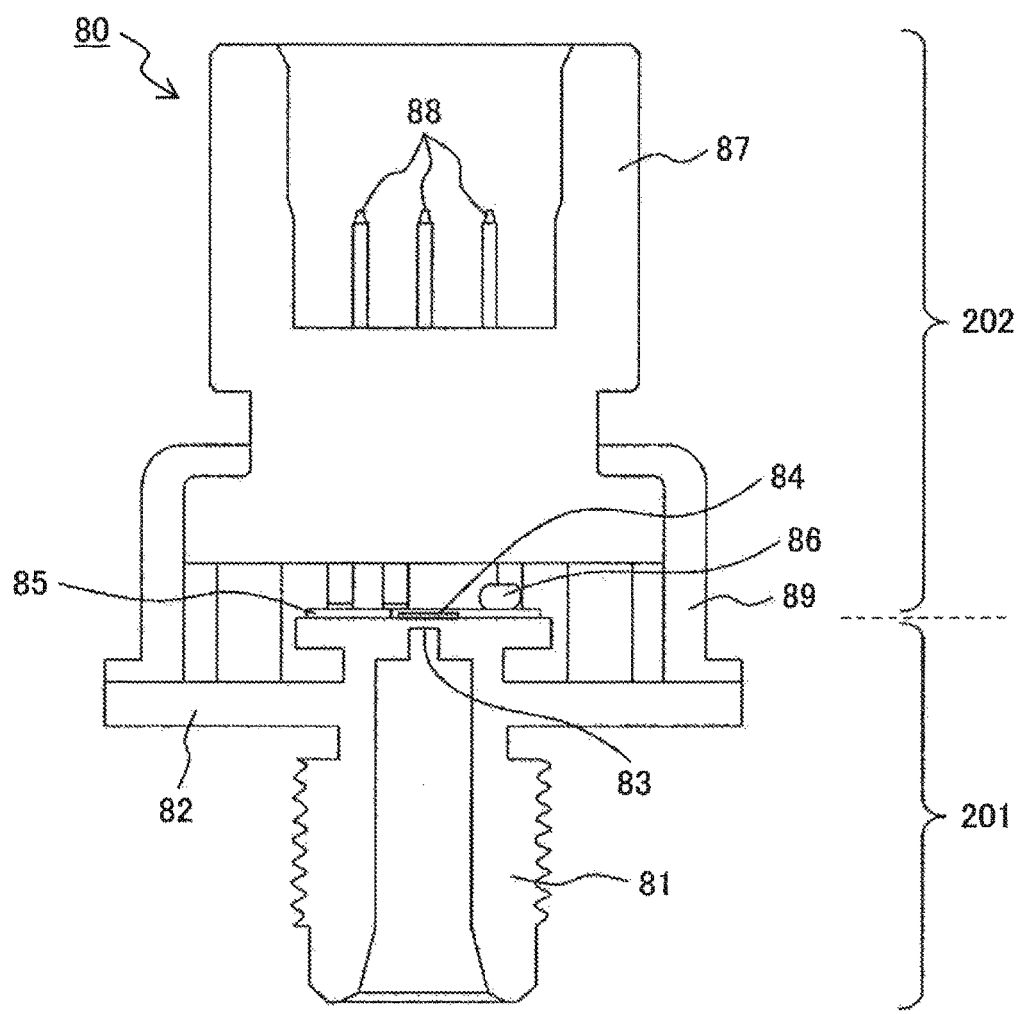
FIG. 10 is a schematic cross-sectional view illustrating an example of a pressure sensor according to the present invention.

Here, the pressure sensor according to the present invention will be described with reference to FIG. 10. The pressure sensor according to the present invention is characterized by employing the mechanical quantity measurement device according to Examples 1 to 3 as a strain sensor. FIG. 10 is a schematic cross-sectional view illustrating an example of the pressure sensor according to the present invention.

As illustrated in FIG. 10, a pressure sensor 80 according to the present embodiment is roughly divided into a sensor section 201, which receives pressure and converts the pressure into an electrical signal, and a connector section 202 which transmits the electrical signal to an external device. The sensor section 201 is configured of a pressure introducing portion 81 which is a metallic bottomed cylindrical body whose one end is opened and the other end is closed and is inserted into a pressure port, a flange 82 which defines an insertion amount of the pressure introducing portion 81, a diaphragm 83 which deforms by receiving the pressure at the closed end side of the pressure introducing portion 81, a strain sensor 84 which is solder-bonded to the diaphragm 83, and a control mechanism (control section) 85 which is connected to the strain sensor 84 and controls the strain sensor 84. A memory in which various types of data to be used for correction calculation, a capacitor 86, and the like are mounted to the control mechanism 85. The connector section 202 is configured of a connector 87 which is connected to the external device, a connection terminal 88 that transmits the electrical signal, and a cover 89 that fix the connector 87 to the sensor section.

Figure 11:
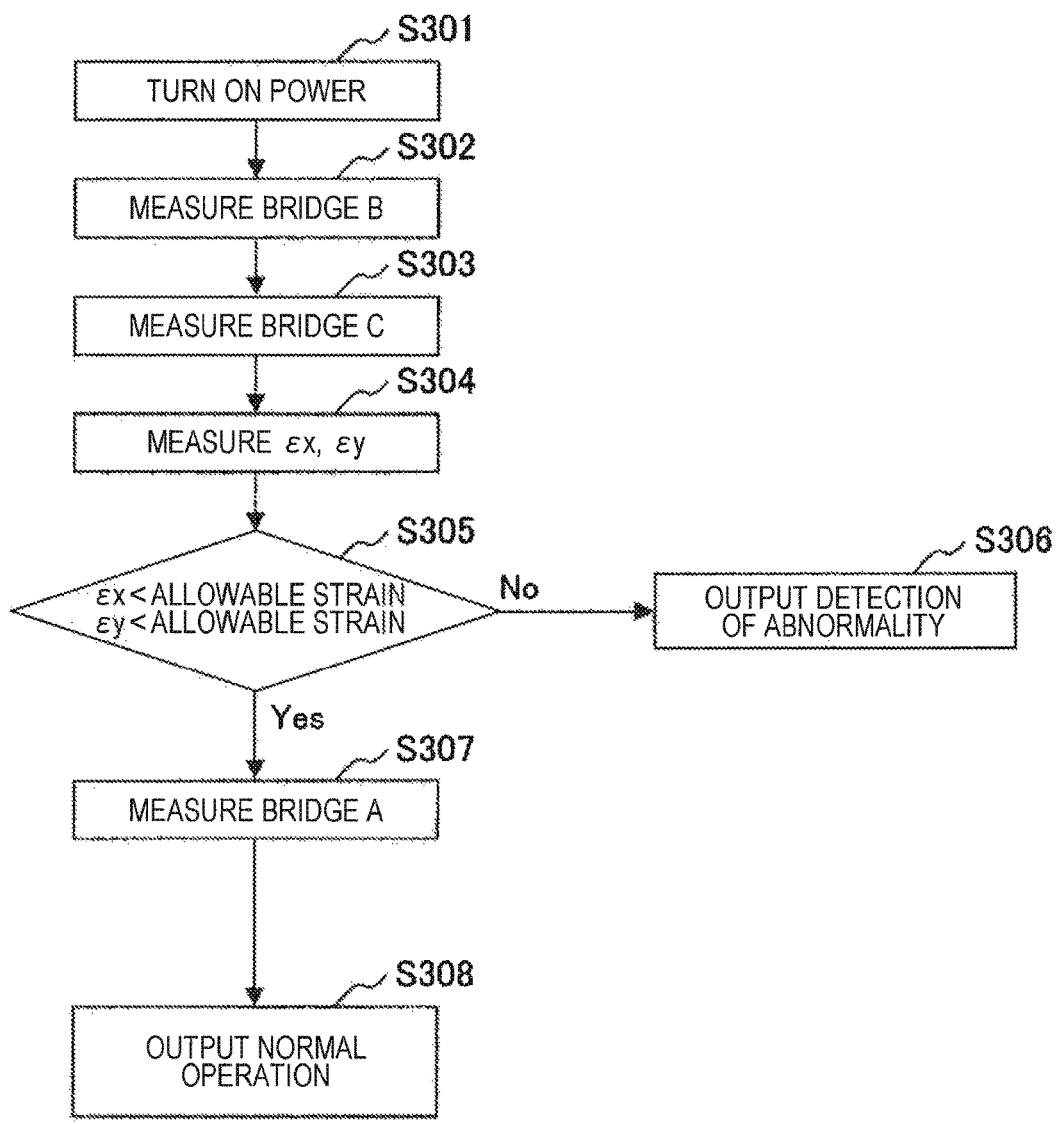
FIG. 11 is a flowchart illustrating an example of an internal operation chart of the pressure sensor using the mechanical quantity measurement device according to the present invention.

FIG. 11 illustrates an example of an internal operation chart of the pressure sensor using the mechanical quantity measurement device that has been described in Examples 1 to 3. After power activation in S301, the absolute value $\varepsilon_x$ of the strain amount generated in the X-axis direction and the absolute value $\varepsilon_y$ of the strain amount generated in the Y-axis direction are derived by the mechanical quantity measurement device according to Examples 1 to 3 in Step S304 based on each output voltage of the Wheatstone bridges B and C measured in Steps S302 and S303. In Step S305, it is determined whether those results exceed each allowable strain amount (reference values of the strain amount: an X-axis direction reference value, a Y-axis direction reference value) at the silicon chip or the mounting interface. When at least any one of $\varepsilon_x$ and $\varepsilon_y$ exceeds the allowable strain amount, the process proceeds to Step S306, and a predetermined voltage value for notification of detection of an abnormality is output from the output terminal 7. The predetermined voltage value for notification of detection of the abnormality is set to a voltage value outside an output range during the normal operation, for example, a ground voltage or the like. In addition, when both $\varepsilon_x$ and $\varepsilon_y$ are equal to or smaller than each allowable strain amount, the process proceeds to Step S307, and a measurement result in accordance with a difference between the strain amount in the X-axis direction and the strain amount in the Y-axis direction is obtained by the Wheatstone bridge A. Further, the process proceeds to Step S308, and the measurement result is output from the output terminal 7 as a voltage value in the output range during the normal operation. Accordingly, it is possible to secure the high reliability in the pressure sensor. Thus, the mechanical quantity detection device and the pressure sensor according to each of the above-described embodiments is provided with a storage device such as a ROM to store the X-axis direction reference value and the Y-axis direction reference value which are the reference values of the strain amount. This storage device is provided in the correction circuit 11 in each of the above-described embodiments.

Incidentally, the flowchart that has been described in FIG. 11 can be executed only with the single mechanical quantity measurement device 30.

Incidentally, the above-described embodiments have been described to assist the understanding of the present invention, and the present invention is not limited to only the described specific configurations. For example, some configurations of a certain embodiment can be substituted by configurations of another embodiment, and further, a configuration of another embodiment can be added to a configuration of a certain embodiment. That is, the configuration of any one of the embodiments in the present specification may be partially subjected to deletion, the replacement with a different configuration, or the addition of a different configuration in the present invention.

REFERENCE SIGNS LIST 1 monocrystalline silicon substrate
2 impurity diffusion resistor
3 Wheatstone bridge
4 power supply terminal
5 ground terminal
6, 8, 9 amplifier circuit
7 output terminal
10 semiconductor strain sensor
11 correction calculation circuit
12, 13, 14, 15 switch circuit
16 amplifier circuit
17 correction calculation circuit
20, 20' pseudo pressure sensor
21, 21' metal plate
22 solder bonding layer
23 terminal base
30, 30' mechanical quantity measurement device
31 amplifier circuit
50 Wheatstone bridge circuit wiring
51, 52, 53, 54 Wheatstone bridge wiring portion (side)
80 pressure sensor
81 pressure introducing portion 82 flange
83 diaphragm
84 strain sensor
85 control mechanism
86 capacitor
87 connector
88 connection terminal
89 cover
A first Wheatstone bridge
B second Wheatstone bridge
C third Wheatstone bridge

The invention claimed is:

1. A mechanical quantity measurement device comprising:
  a first Wheatstone bridge which is configured using an impurity diffusion resistor on a main surface of a single semiconductor substrate, a difference between a strain amount generated in an x-axis direction and a strain amount generated in a y-axis direction, which are orthogonal to each other, on the main surface of the semiconductor substrate being detected by the first Wheatstone bridge; and
  a second Wheatstone bridge which detects the strain amount in the x-axis direction, and a third Wheatstone bridge which detects the strain amount in the y-axis direction, on the main surface of the semiconductor substrate.

2. The mechanical quantity measurement device according to claim 1, wherein
  the main surface of the semiconductor substrate is a surface {100} of monocrystalline silicon.

3. The mechanical quantity measurement device according to claim 2, wherein
  the x axis direction and the y-axis direction match a direction <110> of a silicon substrate,
  the first Wheatstone bridge includes four resistors that cause current to flow in the direction <110>, and the four resistors are configured of a first y-axis-direction resistor and a second y-axis direction resistor, formed using P-type diffusion resistors each of which has a longitudinal direction in the y-axis direction and is arranged in a direction to cause current to flow in parallel with the y-axis, and a first x-axis-direction resistor and a second x-axis-direction resistor formed using P-type diffusion resistors each of which has a longitudinal direction in the x-axis direction and is arranged in a direction to cause current to flow in parallel with the x-axis,
  the second Wheatstone bridge is configured of a first polysilicon resistor and a second polysilicon resistor, each of which causes current to flow in the direction <110>, has a longitudinal direction in the x-axis direction, and is arranged in a direction to cause current to flow in parallel with the x-axis, and a first inclination resistor and a second inclination resistor formed using P-type diffusion resistors which cause current to flow in a direction <100>, have each longitudinal direction in each direction inclined from the x-axis direction and the y-axis direction by 45 degree, and cause current to flow in parallel with each direction inclined from the x-axis direction and the y-axis direction by 45 degree, and
  the third Wheatstone bridge is formed of a third polysilicon resistor and a fourth polysilicon resistor, each of which causes current to flow in the direction <110>, has a longitudinal direction in the y-axis direction, and is arranged in a direction to cause current to flow in parallel with the y-axis, and a third inclination resistor and a fourth inclination resistor formed using P-type diffusion resistors which cause current to flow in the direction <100>, have each longitudinal direction in each direction inclined from the x-axis direction and the y-axis direction by 45 degree, and cause current to flow in parallel with each direction inclined from the x-axis direction and the y-axis direction by 45 degree.

4. The mechanical quantity measurement device according to claim 3, comprising
  a single Wheatstone bridge circuit wiring which includes a first wiring portion, a second wiring portion, a third wiring portion, and a fourth wiring portion,
  wherein the first Y-axis-direction resistor, the third polysilicon resistor, and the first inclination resistor are provided in parallel in the first wiring portion via a first switch circuit,
  the second X-axis-direction resistor, the second polysilicon resistor, and the fourth inclination resistor are provided in parallel in the second wiring portion via a second switch circuit,
  the second Y-axis-direction resistor, the fourth polysilicon resistor, and the second inclination resistor are provided in parallel in the third wiring portion via a third switch circuit,
  the first X-axis-direction resistor, the first polysilicon resistor, and the third inclination resistor are provided in parallel in the fourth wiring portion via a fourth switch circuit,
  any one resistor among the first Y-axis-direction resistor, the third polysilicon resistor, and the first inclination resistor is selected and is electrically connected to the first wiring portion by the first switch circuit,
  any one resistor among the second X-axis-direction resistor, the second polysilicon resistor, and the fourth inclination resistor is selected and is electrically connected to the second wiring portion by the second switch circuit,
  any one resistor among the second Y-axis-direction resistor, the fourth polysilicon resistor, and the second inclination resistor is selected and is electrically connected to the third wiring portion by the third switch circuit, and
  any one resistor among the first X-axis-direction resistor, the first polysilicon resistor, and the third inclination resistor is selected and is electrically connected to the fourth wiring portion by the fourth switch circuit so that the first Wheatstone bridge, the second Wheatstone bridge, and the third Wheatstone bridge are configured in a time-division manner.

5. The mechanical quantity measurement device according to claim 3, wherein
  the respective resistors forming the first, second, and third Wheatstone bridges are arranged to be adjacent to each other at an interval which is shorter than each length of the resistors in the longitudinal direction.

6. The mechanical quantity measurement device according to claim 3, wherein
  an amplifier circuit, which receives and amplifies each output differential voltage of the first, second, and third Wheatstone bridges, and an output terminal of the amplifier circuit are arranged on the main surface of the semiconductor substrate.

7. The mechanical quantity measurement device according to claim 3, comprising a storage device which stores a reference value of a strain amount in the x-axis direction and a reference value of a strain amount in the y-axis direction, wherein the mechanical quantity measurement device has a function of comparing the strain amount in the x-axis direction detected by the second. Wheatstone bridge and the strain amount in the y-axis direction detected by the third Wheatstone bridge with the respective reference values stored in the storage device.

8. The mechanical quantity measurement device according to claim 7, wherein when at least any one of the strain amount in the x-axis direction and the strain amount in the y-axis direction exceeds the reference value as a result of the comparison using the function, the mechanical quantity measurement device has a function of notifying an outside of such a state.

9. A pressure sensor comprising a semiconductor strain sensor bonded onto a metallic diaphragm, wherein the semiconductor strain sensor is the mechanical quantity measurement device according to claim 1.

10. The pressure sensor according to claim 9, wherein the semiconductor strain sensor is bonded onto the metallic diaphragm by solder bonding.

11. The pressure sensor according to claim 9, wherein the pressure sensor is a pressure sensor for an automobile engine.

12. The pressure sensor according to claim 11, wherein the pressure sensor has a function of notifying an outside of detection of pressure when the pressure exceeding a rated pressure set in advance is detected.

13. The pressure sensor according to claim 11, comprising a storage device which stores a reference value of a strain amount in an x-axis direction and a reference value of a strain amount in a y-axis direction, wherein, the pressure sensor has a function of comparing the strain amount in the x-axis direction detected by the second Wheatstone bridge and the strain amount in the y-axis direction detected by the third Wheatstone bridge with the respective reference values stored in the storage device, and when at least any one of the strain amount in the x-axis direction and the strain amount in the y-axis direction exceeds the reference value, the pressure sensor has a function of notifying an outside of such a state.

\* \* \* \* \*